United States Patent [19]

de Versterre et al.

[11] 4,399,836

[45] Aug. 23, 1983

[54] SELF-CONTAINED CLOSED-LOOP ELECTRICALLY OPERATED VALVE

[75] Inventors: William I. de Versterre, Warren; Donald A. Worden, Pompton Plains, both of N.J.

[73] Assignee: Marotta Scientific Controls, Inc., Boonton, N.J.

[21] Appl. No.: 254,096

[22] Filed: Apr. 14, 1981

[51] Int. Cl.³ .......... F16K 31/02

[52] U.S. Cl. .......... 137/487.5; 251/367; 251/129

[58] Field of Search .......... 137/487.5; 251/367, 251/129, 131

[56] References Cited

U.S. PATENT DOCUMENTS

| | | | |
|---|---|---|---|
| 3,386,620 | 6/1968 | Smith | 251/131 X |
| 4,038,982 | 8/1977 | Burke | 137/487.5 X |

*Primary Examiner*—Alan Cohan
*Attorney, Agent, or Firm*—Hopgood, Calimafde, Kalil, Blaustein & Judlowe

[57] ABSTRACT

The invention contemplates an electrically operated valve construction for control of fluid flow wherein an actuator module is adapted for detachable connection to a valve-body module which contains the valve member to be automatically positioned by a driver element of the actuator module. All electronic components for moving the driver element are self-contained in the actuator module, and these elements include a fluid-sensing transducer producing an electrical output, for closure of the control loop. The transducer has sealed exclusive exposure to fluid in the valve-body module via a special port within the confines of the interface between the modules, when the modules are assembled to each other; this port communicates directly with that part of the valve-body passage which is on the downstream side of the valve member. An electric cable for external supply of power (and, if desired, command signals) is provided to the actuator module via connector elements exposed for detachable connection at the interface between modules, so that the actuator module requires no wiring or plumbing or other mechanical coupling that is not detachable at the interface between modules.

13 Claims, 5 Drawing Figures

SELF-CONTAINED CLOSED-LOOP ELECTRICALLY OPERATED VALVE

BACKGROUND OF THE INVENTION

The invention relates to an electrically operated valve construction, for closed-loop control of fluid flow through the valve.

Past constructions of the character indicated reflect the entrenched view that electrical-control circuitry for a valve which is to govern fluid flow, particularly liquids, should, to the greatest extent possible, be kept safely remote from the valve and the fluid it accommodates. Such thinking necessarily means much wiring and wiring connections, all invitations to electrical (and therefore to valve) malfunction. And in cases where an array of such valves is to function concurrently, each with its own sensed regulation of its own flow condition, the wiring and connection problem becomes particularly acute.

An example of such problems in an array of valves is to be found in the production of high-quality metal sheet which, after rolling, must be cooled without curl, prior to coiling for storage and shipment to achieve the flatness needed for avoidance of curl an array of like coolant-spray valves is connected to a coolant-supply manifold which spans the width of moving hot sheet material as it issues from the rolling mill, and each valve spray serves a different increment of width of the hot moving sheet. Since cooling effectiveness is different for the different increments of width, and since the distribution of coolant flow as a function of width-increment location is essential to avoidance of curl, a separate sensing of the transverse profile of sheet-temperature conditions is continuously necessary, at a location downstream from that of coolant-spraying; and each valve must be automatically controlled to correctly reflect its local increment of cooperative influence upon the observed profile, to the end that the observed profile will remain as predetermined for satisfactory production without curl. To externally bring all electrical wiring to and from the valves, and to and from the profile-sensing apparatus, is necessarily to require great electrical complexity.

BRIEF STATEMENT OF THE INVENTION

It is an object of the invention to provide an improved electrically operated valve construction of the character indicated, wherein external electrical connection requirements are materially reduced; stated in other words, it is an object to provide such a valve construction which is self-contained to the greatest electrical extent possible.

It is a specific object to meet the foregoing objects with a construction in which an actuator module is detachably related to a valve-body module which contains the valve member, all closed-loop electrical and electromechanical control elements being self-contained in the actuator module.

Another specific object is to meet the preceding specific object with a construction wherein a transducer having an electrical output responsive to a fluid condition downstream from the valve member is nevertheless a permanent electrically connected part of the actuator valve.

A general object is to provide valve structure of modular simplicity and inherent reliability, offering substantially improved performance capability, as compared to past constructions.

The invention achieves the foregoing objects and certain further features by providing a unitary valve-positioning actuator module having a mounting face adapted for removable assembly in register to the mounting face of a valve-body module having (a) a valve stem exposed and (b) a fluid-passage port exposed at the mounting face. The actuator module includes a guided valve-stem-engageable element exposed within the confines of the mounting face, for actuating engagement with the exposed end of the valve stem, when the modules are assembled, in register, at their mounting faces. The actuator module further includes electromagnetic means including a driver winding for applying displacement force to the valve stem via the valve-stem-engageable element. The winding is excited by signal-processing means contained within the actuator module; and, as a further feature of the actuator module, electrical completion of the control loop to the signal-processing means includes a transducer exposed at the mounting face of the actuator module, in register with the fluid-passage port exposed at the mounting of the valve-body module.

DETAILED DESCRIPTION

The invention will be illustratively described, for a preferred embodiment, in conjunction with the accompanying drawings, in which.

Figure 1:
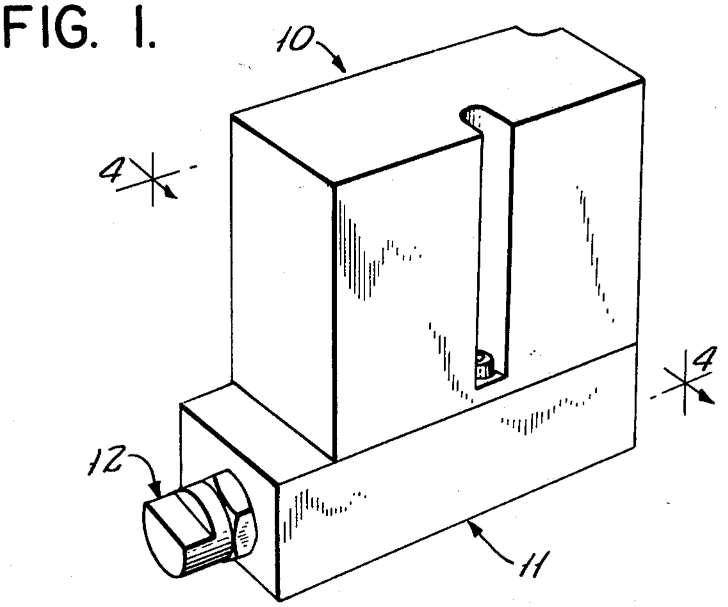
FIG. 1 is a view in perspective of a self-contained, closed-loop, electrically operated valve of the invention, showing actuating-module and valve-body module components thereof in assembled relation.

The valve of the invention is shown in FIG. 1 to comprise an upper or actuator module 10 removably assembled to a lower or valve-body module 11. Each of these modules is rectangularly prismatic, and they function through instrumentalities which cooperatively register within the confines of the interface at which their respective mounting faces are juxtaposed. In FIG. 1, a spray head or nozzle 12 is fitted to the outlet port of an internal fluid-flow passage in the valve-body member, the flow being governed by positioning of a valve member contained within the valve-body member, as will be more fully explained, commencing with FIG. 2.

Figure 2:
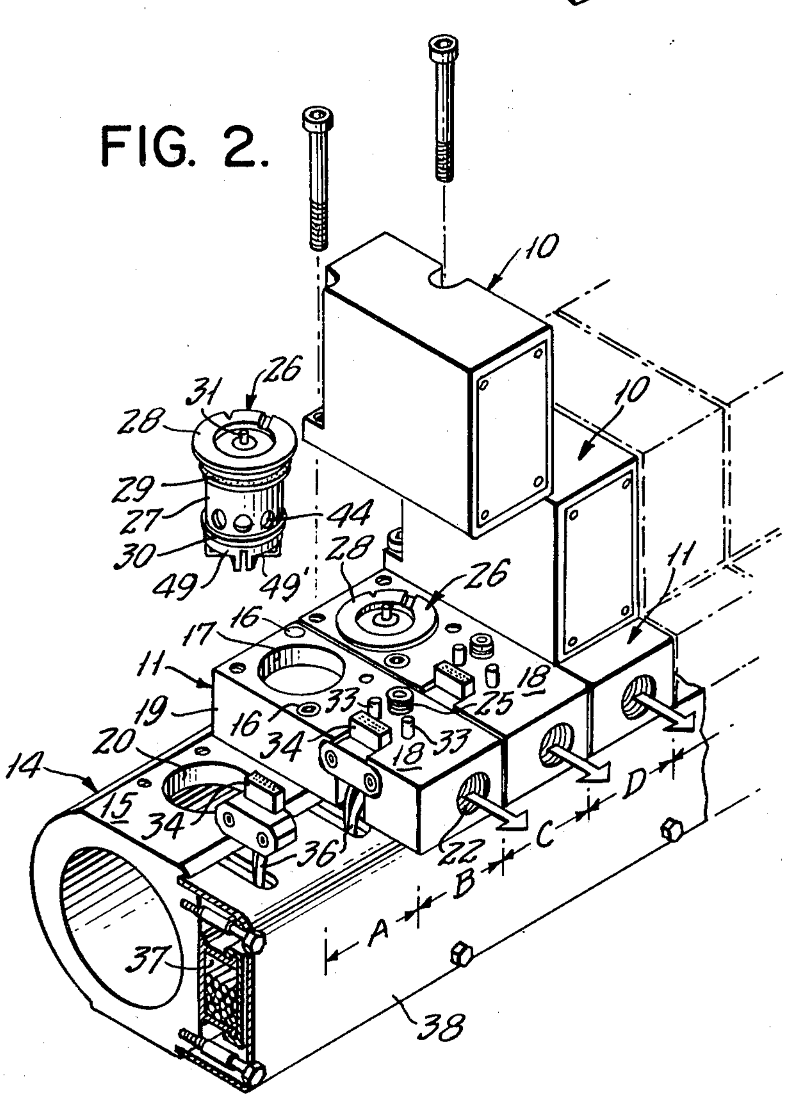
FIG. 2 is a fragmentary and partly exploded perspective view of a multiple-valve array representing one end-use application of a plurality of valves as shown in FIG. 1.

FIG. 2 shows a multiple-valve array of valves as in FIG. 1, in conjunction with an elongate manifold 14 which may be an inlet manifold for coolant liquid to be sprayed by the respective valve of the array, in successive width increments, across the width of continuously moving rolled metal sheet (not shown), as in the problem situation illustratively expressed above; the coolant manifold 14 is shown with a flat upper surface 15 to which successive duplicates of the valve-body module 11 of FIG. 1 are individually secured at adjacent array-element locations A, B, C, D, by bolts 16 at diametrically opposed locations outside a bore 17 that is normal to the mounting face 18 of module 11. It will be understood that the bore 17 extends through the body 19 of each module 11 and that when bolted at 16, each valve-body module has peripherally sealed communication with its own supply port 20 in the coolant-inlet manifold 14; in FIG. 4, this sealed communication is assured by a transfer bushing 21 having separate O-ring sealed lap with a counterbore in body 19 and with the bore of port 20.

Figure 4:
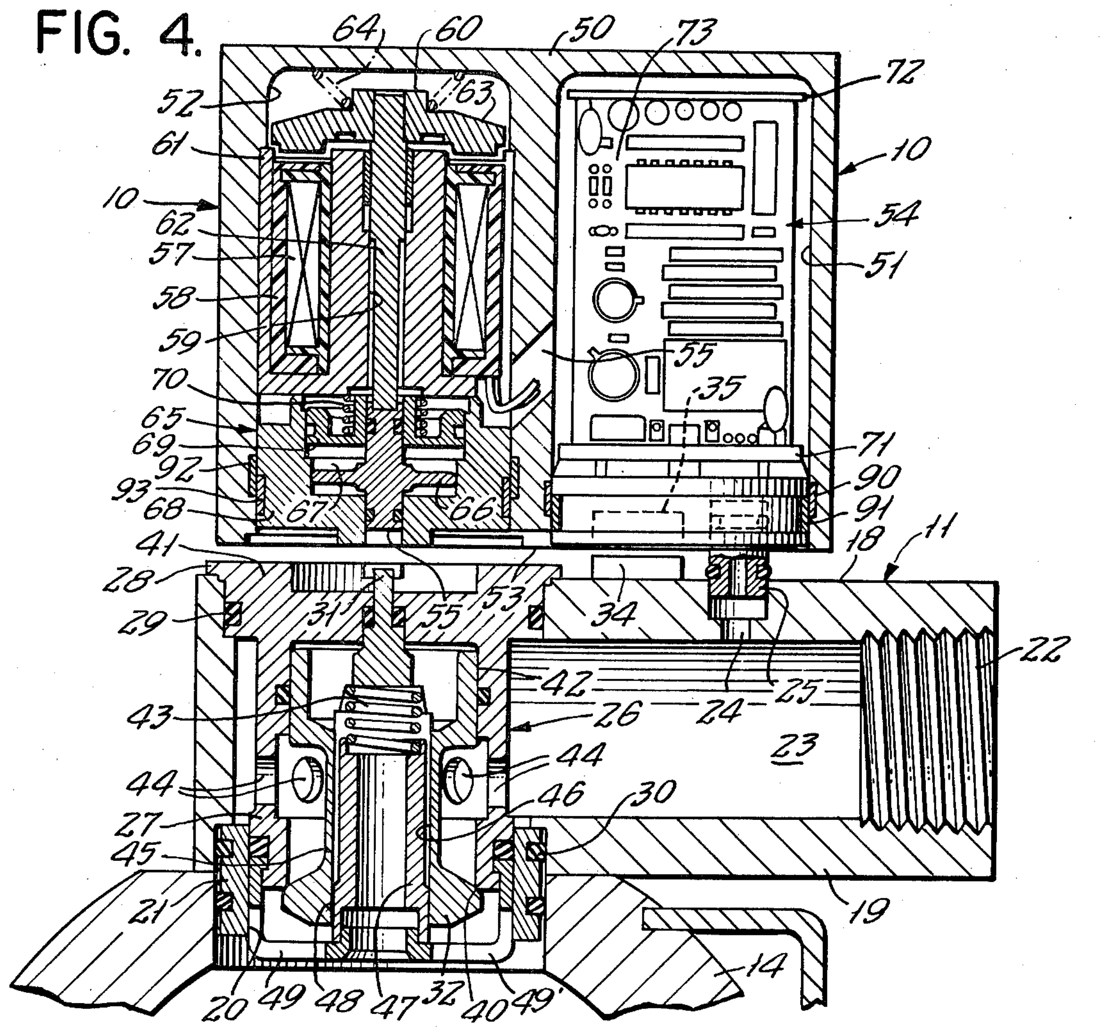
FIG. 4 is an enlarged, slightly exploded, sectional view, taken in the median plane designated 4—4 in FIG. 1, to reveal internal construction.

Each valve body 19 has an internal through-passage for accommodation of fluid flow from an inlet port (provided by bushing 21) to an outlet port 22, shown threaded for application of a selected discharge fitting, such as the spray nozzle 12 of FIG. 1; in FIG. 4, the downstream fraction of this through-passage is seen as a straight bore 23, from outlet port 22 to an intermediate region of the bore 17. A special fluid-sensing port 24 opens to the mounting face 18 and communicates with the downstream-end passage 23, and an O-ring-sealed transfer bushing 25 enables sealed integrity of local fluid communication through the interface between adjacent mounting surfaces of the modules 10–11.

A valve cartridge or module 26 is removably insertable in the bore 17 and, thus assembled, it becomes part of the valve-body module 11. Cartridge 26 comprises a generally cylindrical insert body 27 having an upper-end flange 28 which may be received in an upper counterbore of the bore 17, to enable flush-mounting of the cartridge at the plane of mounting face 18, but which in the form shown in FIG. 2 is seated upon the mounting face 18. The cartridge body 27 positions upper and lower O-ring seals 29–30 for sealed relation to bore 17 above and below the intermediate zone of communication with downstream passage 23; as seen in FIG. 4, the lower seal ring 30 engages the bore of transfer bushing 21 to effect its seal. When valve cartridge 26 is flange-mounted to surface 18, as shown for the situation depicted at valve location C in FIG. 2, the upper end of bore 17 is totally closed by the cartridge, and only the reduced upper end of the stem 31 of the valve member 32 contained therein projects upward, above the plane of surface 18 and normal thereto, for coaction with a part of module 10.

Also projecting upward, above the plane of surface 18 and normal thereto, for coaction with other parts of module 10, is a pair of spaced dowels 33 for accurate registration engagement with corresponding sockets (not shown) in the lower or mounting surface of module 10, as well as an upstanding half 34 of a two-part multiple-contact electrical connector, the mating other half of which will be understood to be exposed at the mounting surface of module 10, being suggested at 35 in FIG. 4. As seen in FIG. 2, the upstanding connector element 34 is provided as the flexibly positionable end of a multiple-conductor cable 36 associated with each valve assembly, being located and clamped to body 19 at a local side recess which does not impair the integrity of fluid passage 23; all cables 36 are nested in an insulated wire-way 37 and protected by a removable cover 38 along one side of manifold 14.

Figure 3:
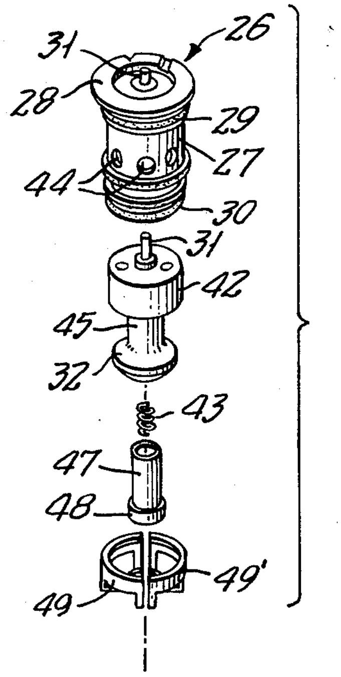
FIG. 3 is an exploded perspective view of a valve cartridge or module which is part of the valve of FIG. 1.

FIGS. 3 and 4 enable further description of the valve cartridge 26, the parts being in exploded relation in FIG. 3. The insert-body part 27 is seen as characterized by a downwardly open bore which terminates at the circular rim of a valve seat 40. The upper end of this bore terminates at a closure wall 41 which is drilled for passage and sealing of the stem 31, of valve member 32, reliance being placed on an upper cylindrical land 42 of valve member 32 for sealed piloting guidance in the bore of body part 27. Valve closure occurs when member 32 rises into seating engagement with the rim of seat 40, this position being constantly urged by a preloading spring 43 (as will be explained) and therefore determining the maximum extent to which stem 31 will project above the plane of mounting face 18. When stem 31 is displaced downwardly, fluid (e.g., coolant liquid) is admitted within the insert body 27 and flows freely through angularly spaced ports 44 in the intermediate zone of body 27; in this zone, body 27 is circumferentially reduced, to define with the bore 17 an annular manifold having downstream communication with the outlet port 22 via passage 23.

Beneath its upper end 31, and in the intermediate zone beneath land 42, the stem of valve member 32 is characterized by a reduced portion 45; within valve member 32, a downwardly open elongate cylindrical bore 46 (spanning a substantial but finite fraction of the length of its stem) accommodates the spring 43. Also within bore 46 is an elongate spring-preloading sleeve 47 having a land 48 from which the bore 46 derives piloting action to coaxially stabilize valve member 32 at its region of seat coaction. As shown, two retainer elements 49–49' have radially inward flange engagement with a retaining groove in body 27, as well as axial-flange engagement with the lower end of the bore of sleeve 27 and, when thus engaged, sleeve 47 applies predetermined axial preload to spring 43, in the valve-closing direction.

The actuator module 10 is seen to be fully self-contained within a rectangular prismatic housing 50 which may be injection-molded of suitable plastic material but which is preferably a machined casting of non-magnetic metal such as aluminum having first and second chamber bores 51–52 which are open to one face, the lower mounting face 53; bore 51 accommodates an insert chassis module 54 of electronic control components, and bore 52 accommodates electromagnetic drive components having registered abutment at 55 with the projecting end 31 of the valve stem when modules 10–11 are assembled, it being noted that bore 52 has a shallow counterbore to receive and locate the flange 28 of the valve-insert module 26. The bores 51–52 have internal communication at 56, to permit electrical connection from chassis 54 to the coil of electrical winding or solenoid 57 forming part of the electromagnetic drive. And bolts 16' at diametrically opposed locations interlaced with locations of bolts 16 removably secure modules 10–11 in firm relation to the upper surface 15 of the coolant manifold.

The electromagnetic drive within bore 52 is shown to comprise a cylindrical core 58 of magnetic-flux conducting material, having a central bore 59 and having an annular cavity which is open at the upper end of the core. Core 58 is thus a cylindrically annular, upwardly open cup, with winding 57 carried within its annular cavity, and may be permanently magnetized to establish a polarized gap between an inner annular pole 60 and a concentric outer annular pole 61; however, it is preferred that core 58 be soft iron (not permanently magnetized), with reliance upon a d-c coil-excitation voltage to develop coercive force. Core 58 is accurately seated in a counterbore of bore 52. An actuator stem 62 of non-magnetic material such as stainless steel is centrally positioned by a suitable guide bushing within bore 59 and carries at its upper end an annular armature 63 of magnetic-flux conducting material. The underside of armature 63 is contoured to define a downwardly projecting annulus characterized by inner and outer concentric but oppositely flared frusto-conical surfaces which have axial and radial lapping relation to corresponding surfaces of the poles 60–61, whereby downward valve-actuating displacement force via stem 62 may, within the operating range of the actuator, be a substantially linear function of winding (57) excitation. As shown, a relatively weak coil spring 64 between armature 63 and the closed end of bore 52 provides an anti-rattle function of the armature and its stem 62.

A separate dashpot subassembly 65 is fitted to the lower end of bore 52. The dashpot involves a piston 66 having an upper-stem portion which receives valve-actuating displacement force from the armature stem 62; piston 66 also has a lower-stem portion which terminates at the exposed abutment 55, within the confines of the mounting face 53 of module 10. Piston 66 is reciprocatable within a cylindrical chamber 67 in a body 68 which effectively closes the actuator bore 52 (except for the exposed abutment 55) and has retaining abutment with the underside of core 58. A floating annular piston 69 has sealed piloting coaction with a cylindrical counterbore in the dashpot body 68 and provides sealed coaxial stability for the upper-stem portion of the dashpot piston 66 and for the engaged lower end of the armature stem 62. It will be understood that for dashpot action, the chamber 67 within which piston 66 operates will have been filled with a suitable oil and that a relatively weakly compressed coil spring 70 reacting between core 58 and the floating piston 69 will assure constant void-free oil filling of the dashpot chamber.

Figure 5:
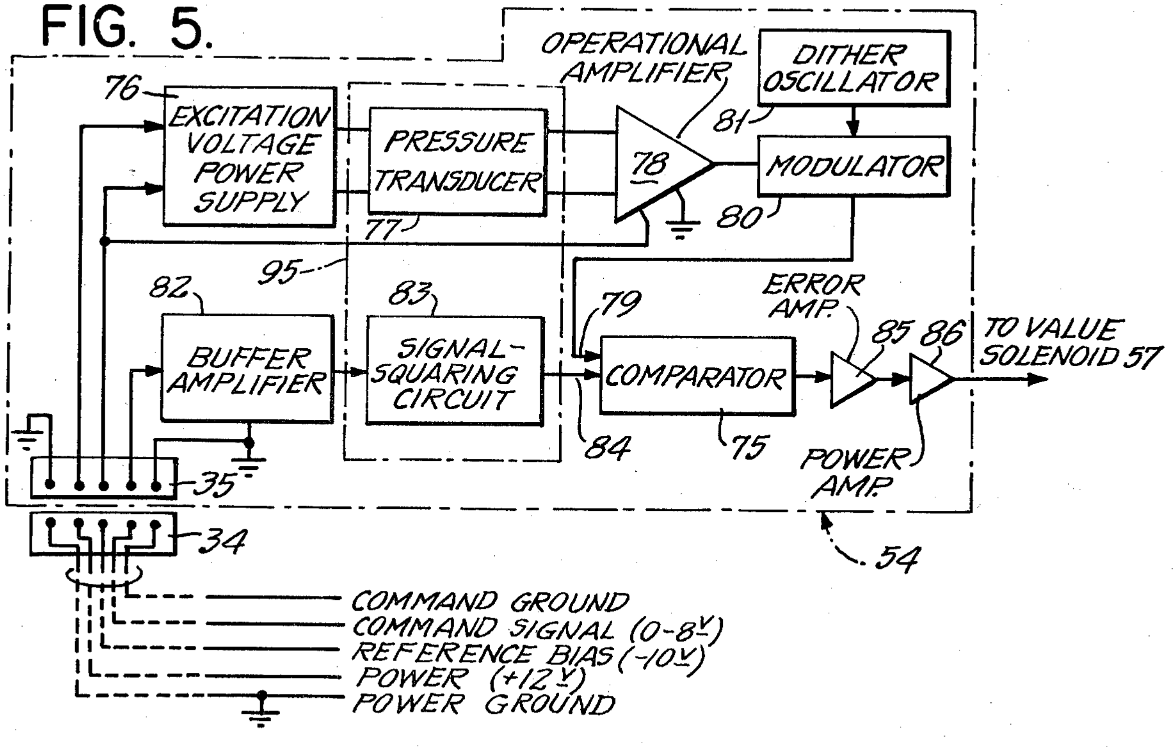
FIG. 5 is an electrical block diagram to show closed-loop control elements contained in the actuating-module component of FIG. 1.

Reference is now made to FIG. 5 for a discussion of electrical components of the chassis module 54, the frame of which is shown to comprise a circular lower board or base 71, a circular upper or top board 72, and a rectangular vertical board 73. Electrical connections to the chassis are made via the separatable connector elements 34–35, when modules 10–11 are plug-in assembled to each other, and as shown five separate lines are thus brought into the module 54, namely (1) command ground, (2) command voltage, with respect to command ground, (3) reference-bias voltage, (4) power voltage and (5) power ground. In a first input line to a comparator 75, externally supplied power and the reference bias enable a local power supply circuit 76 to provide stable excitation voltage to a pressure transducer 77, which may be a commercially available strain-gage bridge, mounted in or to the base 71, for direct exposure to the valve-controlled fluid, via passage 24 and the transfer bushing 25. Transducer-bridge output is supplied to an operational amplifier 78 having ground and bias connections in common with those of the local power supply 76. Output of the operational amplifier 78 is connected to the first input 79 of comparator 75, via a modulator 80, shown supplied by a dither signal from an oscillator 81; a suitable dither frequency is 10 Hertz, for the illustrative situation of pressure-sensed tracking of liquid flow in the downstream passage 23 of valve-body Module 11. In a second input line, the command signal voltage is first buffered at 82 and then squared at 83 before application to the second input 84 of comparator 75; it will be understood that a pressure/flow relationship is a square-law relationship and that such correction must be made if comparator 75 is to produce a linear output to the valve-solenoid winding 57, via the error amplifier (85) and power amplifier (86) shown, it being further recalled that valve-actuating displacement of stem 62 is a substantially linear function of excitation voltage applied to winding 57.

In operation of the described modular valve, as for example as one of the units of the multiple-unit array of FIG. 2, a command-signal voltage will have been established externally for supply via connectors 34–35, such voltage reflecting the coolant flow desired from this one unit, based on its lateral position (e.g., at region D) in the array. The circuit of FIG. 5 treats this command-signal voltage as the norm against which valve operation, with downstream pressure sensed via the transducer 77, is monitored. The dither oscillator 81 produces a continuous ripple on the transducer output and this dither will always characterize the output of comparator 75, thus continuously causing a longitudinal ripple oscillation in valve-stem actuation, all as buffered by the action of dashpot 65. When no change in valve-member position is called for, the dither oscillation will be centered on this position, but changes either side of this position will involve a shift in the instantaneous center of dither oscillation, the direction of the shift being such as reflect the increase or decrease direction of corrective error-signal development, by reason of the instantaneous voltage comparison made at 75.

It will be seen that the described structure meeting all stated objects and provides important features of reliability in operation. The actuator module 10 fully contains all electrical components needed to serve with equal competence each of the different array locations, A, B, C . . . in which it may be installed, even if the command signal at the connector 34 of each of these locations may be different; in other words, no adjustment or correction of a given module 10 is needed, whatever its installed position, i.e., all actuation modules 10 and all valve-body modules 11 of a given array may be exact interchangeable duplicates of each other.

It will be understood that various techniques may be employed to secure inserted components in each of the chambers 51–52 of the housing 50 of module 10. Our preference is for a permanently secured installation. As shown, for the electronic chassis 54, a first circumferential band 90 of fusible material such as solder is retained at a groove in bore 51, and a second such band 92 is fitted to bore 51 in partial telescopic overlap with band 90, after insertion of the chassis module to the pont of top-board (72) location at the inner end of bore 51. Heat is then applied to circumferentially continuously fuse the bands 90–91 to each other. Similarly, for the driver elements, a first such band 92 in a groove in bore 52, is lapped by a second such band 93 in an external groove in the dashpot body 68, when body 68 holds core 58 in its counterbore-seated position; whereupon, applied local heat fuses the bands 92–92' to retain a circumferentially continuous and sealed fit.

While the invention has been described in detail for a preferred form, it will be understood that modifications may be made within the scope of the invention. For example, the use of a pressure transducer at 77 will be understood to be purely illustrative, calling for a square-law correction at 83. But the invention may be used in other than a pressure-sensing context, and such other context may not require a square-law correction. For example, temperature sensing at 24–25, as by using a bead thermistor at 77, may enable a different parameter to control valve operation, without resort to a square-function correction. The use of a phantom outline 95 in FIG. 5 will be understood to suggest that means 77–83 may be replaced by other devices in the respective signal arms to comparator 75, depending upon the parameter selected or function desired for automatic valve-position monitoring and control.

For the described case of a sensed tracking of pressure in a valve equipped with a nozzle 12 which is rated between 4 and 25 gpm at 40 psi, coolant flow is achieved as a linear function of the d-c command signal, and combined non-linearity and hysteresis are less than $\pm 1$ percent of full scale. More specifically, for a nozzle rated at 11.5 gpm at 40 psi, the described valve system provides linear flow control to 20 gpm at 120 psi, with 150 psi inlet pressure. The valve remains closed at low signal levels where low pressure and low velocity make spray cooling ineffective, typically when calling for flows requiring less than 2.5 psi nozzle pressure.

What is claimed is:

1. In combination, a unitary valve-positioning actuator module comprising a housing having a mounting face, a valve-body module having a mounting face adapted for removable assembly in register to the mounting face of said actuator module, said valve-body module having an internal passage between spaced inlet and outlet ports which are offset from the mounting face of said valve-body module; said valve-body module including (a) a movable valve member for controlling flow in said passage, (b) an actuating stem for said valve member and exposed within the confines of said valve-member mounting face, and (c) means normally biasing said stem to a fully projected extent of such exposure; said actuator module including (a) a guided valve-stem-engageable element exposed within the confines of the mounting face of said actuator module and engaging the exposed end of said stem when said modules are in registered assembly, (b) electromagnetic means including a driver winding for applying displacement force to said valve stem via said valve-stem engageable element in accordance with electrical excitation of said winding, and (c) signal-processing means including a transducer exposed at the mounting face of said actuator module and producing an electrical signal output in accordance with a physical-quantity change detected in fluid to which said transducer is exposed, said signal-processing means further including a command-signal external input connection and comparator means having a first input connected to said command-signal input connection and a second input connected to the electrical-signal output of said transducer; and said body module further having within the confines of its mounting face a transducer port communicating with said passage on the downstream side of said valve member, said port having sealed exclusive communication with said transducer when said modules are in registered assembly.

2. The combination of claim 1, in which each of said mounting faces is in essentially a single plane, said valve stem and said valve-stem-engageable element being guided in their respective modules on displacement axes normal to the plane of their associated mounting face.

3. The combination of claim 1, in which said transducer is responsive to detected pressure at said transducer port.

4. The combination of claim 1, in which said electromagnetic means comprises a fixed cylindrically annular cup of magnetic flux-conducting material concentric with the displacement axis of said valve-stem engageable element and establishing an annular gap between concentric poles at one longitudinal end, said winding being contained within said cup, and said valve-stem engageable element including an armature of magnetic flux-conducting material, said armature being in spaced bridging proximity of said poles in the absence of excitation of said winding and when said modules are in registered assembly.

5. The combination of claim 4, in which adjacent gap-defining surfaces of said pole pieces and of said armature are so characterized axially and radially that armature-displacement force is a substantially linear function of the magnitude of electrical winding excitation, at least for the operating range of valve-member displacement.

6. The combination of claim 1, in which said valve member and stem are assembled components of a third module, having sealed removably insertable assembly to a valve body in order to complete said valve-body module, said valve body having a bore normal to the valve-body mounting face and totally encompassing said inlet port, said passage extending to said outlet port from an intermediate region of said bore; said third module comprising an insert body having circumferentially sealed engagement with said bore at first and second regions on opposed sides of said intermediate region, said insert body having an internal passage including a valve seat communicating between said inlet port and said outlet port via said intermediate region when said valve module is assembled to the bore of said valve body, and said valve member and stem being guided by by insert body.

7. The combination of claim 1, in which said actuator-module housing is a generally rectangular-prismatic solid having two spaced parallel bores normal to and open only within the confines of the mounting face of said actuator module, said electromagnetic means and said valve-stem-engageable element constituting a first subassembly supported by and sealed within one of said bores and closing said one bore with end exposure of said valve-stem-engageable element at said mounting face, said signal-processing means constituting a second subassembly supported by and sealed within the other of said bores and closing said other bore with exposure of said transducer at said mounting face.

8. The combination of claim 7, in which said external input connection comprises two separable plug-and-socket connector elements one of which is a fixed part of said second subassembly with mounting-face exposure for removable connection to the other of said connector elements.

9. The combination of claim 8, in which said valve-body module includes means for removably mounting said other connector element with exposure at the mounting face of said valve-body module, for establishing electrical input connection upon assembly of said modules to each other.

10. The combination of claim 1, in which said signal-processing means includes a dither oscillator and modulator operative upon one of the input connections to said comparator.

11. The combination of claim 10, in which said modulator is connected for operation upon the signal output of said transducer.

12. The combination of claim 1 or claim 10, in which said valve-stem-engageable element includes a portion having longitudinal dashpot coaction with a fixed part of said housing.

13. As an article of manufacture, a unitary valve-positioning actuator module adapted for removable assembly in register to the mounting face of a valve-body module having a valve stem end exposed and a fluid-passage port exposed at the mounting face; said actuator module comprising a single housing having a single mounting face and including within said housing a movably guided valve-stem-engageable element externally exposed within the confines of said single mounting face for displaceable actuating engagement with the exposed stem end when in registered assembly with the valve-body module, electromagnetic means including a driver winding for applying displacement force to said valve-stem-engageable element in accordance with electrical excitation of said winding, and signal-processing means including a transducer exposed within the confines of said single mounting face for register with the fluid-passage port, said transducer producing an electrical signal output in accordance with a physical quality change detected in fluid to which said transducer is exposed, said signal-processing means further including a command-signal external input connection, and comparator means having a first input connected to said command-signal input connection and a second input connected to the electrical-signal output of said transducer.

* * * * *